(12) United States Patent
Jain et al.

(10) Patent No.: US 11,604,942 B2
(45) Date of Patent: Mar. 14, 2023

(54) METHOD AND APPARATUS FOR DETERMINING DATA LINKAGE CONFIDENCE LEVELS

(71) Applicant: Walmart Apollo, LLC, Bentonville, AR (US)

(72) Inventors: Mridul Jain, Cupertino, CA (US);
Saigopal Thota, Fremont, CA (US);
Xun Luan, Santa Clara, CA (US);
Gajendra Alias Nishad Kamat, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 1079 days.

(21) Appl. No.: 16/263,625

(22) Filed: Jan. 31, 2019

(65) Prior Publication Data
US 2020/0250478 A1    Aug. 6, 2020

(51) Int. Cl.
| | |
|---|---|
| *G06F 9/44* | (2018.01) |
| *G06K 9/62* | (2022.01) |
| *G06F 16/901* | (2019.01) |
| *G06Q 30/0201* | (2023.01) |
| *G06N 20/10* | (2019.01) |
| *G06N 20/20* | (2019.01) |
| *G06F 17/18* | (2006.01) |

(52) U.S. Cl.
CPC ....... *G06K 9/6257* (2013.01); *G06F 16/9024* (2019.01); *G06F 17/18* (2013.01); *G06N 20/10* (2019.01); *G06N 20/20* (2019.01); *G06Q 30/0201* (2013.01)

(58) Field of Classification Search
CPC .................................................... G06K 9/6257
USPC ......................................................... 706/12
See application file for complete search history.

(56) References Cited

U.S. PATENT DOCUMENTS

2012/0054129 A1*   3/2012  Aggarwal .............. G06N 20/00
                                                      709/204

* cited by examiner

*Primary Examiner* — Timothy A Mudrick
(74) *Attorney, Agent, or Firm* — Morgan Lewis & Bockius LLP; Manita Rawat

(57) ABSTRACT

This application relates to apparatus and methods for determining confidence levels in associated data using machine learning algorithms. In some examples, a computing device may generate training graph data where each training graph connects at least two nodes by an edge, and each node represents data. The computing device may train a machine learning algorithm based on the generated training data. The computing device may then receive linked data, which associates at least two nodes, each representing data, with each other. The computing device may generate graph data based on the linking data, to provide to the machine learning algorithm as input. The computing device may then execute the machine learning algorithm on the generated graph data to generate values for each of its edges. The values may identify, for each edge, a confidence level in the connection between the two nodes for that edge.

20 Claims, 7 Drawing Sheets

METHOD AND APPARATUS FOR DETERMINING DATA LINKAGE CONFIDENCE LEVELS

TECHNICAL FIELD

The disclosure relates generally to data analysis and, more specifically, to determining confidence levels in linked data.

BACKGROUND

At least some retailers collect customer information for a variety of reasons. Customer information may include information that identifies the customer, or information related to their purchase history, such as in-store purchase information or online purchase information, for example. In some examples, customer information may include customer advertisement activity, such as whether an online advertisement was viewed or clicked on by the customer, and whether a purchase resulted from the view or click. Retailers may collect customer information to determine purchasing habits of those customers, for example.

Retailers may collect customer information from either internal sources (e.g., in-store purchases, accounts customers have created with the retailer, online accounts, online purchases made on a retailer's website, etc.), or external sources, such as third-party providers of customer information. At least some systems link customer data that is believed to be associated with a same customer. For example, a credit card number, and address, and an online account user name may be linked as being associated with a same customer. Retailers may benefit from identifying a customer associated with customer data, such as to properly attribute in-store or online purchases, or customer advertisement activity, to the proper customer. However, linked data is not always accurate, resulting in false associations.

SUMMARY

The embodiments described herein are directed to automatically determining confidence levels of linked data, such as linked customer data, for a corresponding customer. As a result, a retailer may be able to more effectively track customer activity, such as in-store purchases, online purchases, customer advertisement activities, or any other suitable customer related activities to a proper customer.

In some embodiments, a computing device is configured to obtain training data comprising a plurality of training nodes linked by a plurality of training edges. The computing device may also be configured to train a machine learning algorithm based on the obtained training data. The computing device may be configured to obtain linkage data identifying a plurality of linkages, where each linkage identifies a plurality of nodes, and generate graph data identifying a plurality of edges, where each edge associates at least two of the plurality of nodes of each linkage of the plurality of linkages. The computing device may be configured to execute the machine learning algorithm based on the generated graph data. In some examples, the computing device is configured to generate a value for each edge associated with the at least two of the plurality of nodes of each linkage of the plurality of linkages.

In some embodiments, a method is provided that includes obtaining training data comprising a plurality of training nodes linked by a plurality of training edges. The method may also include training a machine learning algorithm based on the obtained training data. The method may further include obtaining linkage data identifying a plurality of linkages, where each linkage identifies a plurality of nodes, and generating graph data identifying a plurality of edges, where each edge associates at least two of the plurality of nodes of each linkage of the plurality of linkages. The method may also include executing the machine learning algorithm based on the generated graph data. In some examples, the method may include generating a value for each edge associated with the at least two of the plurality of nodes of each linkage of the plurality of linkages.

In yet other embodiments, a non-transitory computer readable medium has instructions stored thereon, where the instructions, when executed by at least one processor, cause a device to perform operations that include obtaining training data comprising a plurality of training nodes linked by a plurality of training edges. The operations may also include training a machine learning algorithm based on the obtained training data. The operations may further include obtaining linkage data identifying a plurality of linkages, where each linkage identifies a plurality of nodes, and generating graph data identifying a plurality of edges, where each edge associates at least two of the plurality of nodes of each linkage of the plurality of linkages. The operations may also include executing the machine learning algorithm based on the generated graph data. In some examples, the operations may include generating a value for each edge associated with the at least two of the plurality of nodes of each linkage of the plurality of linkages.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
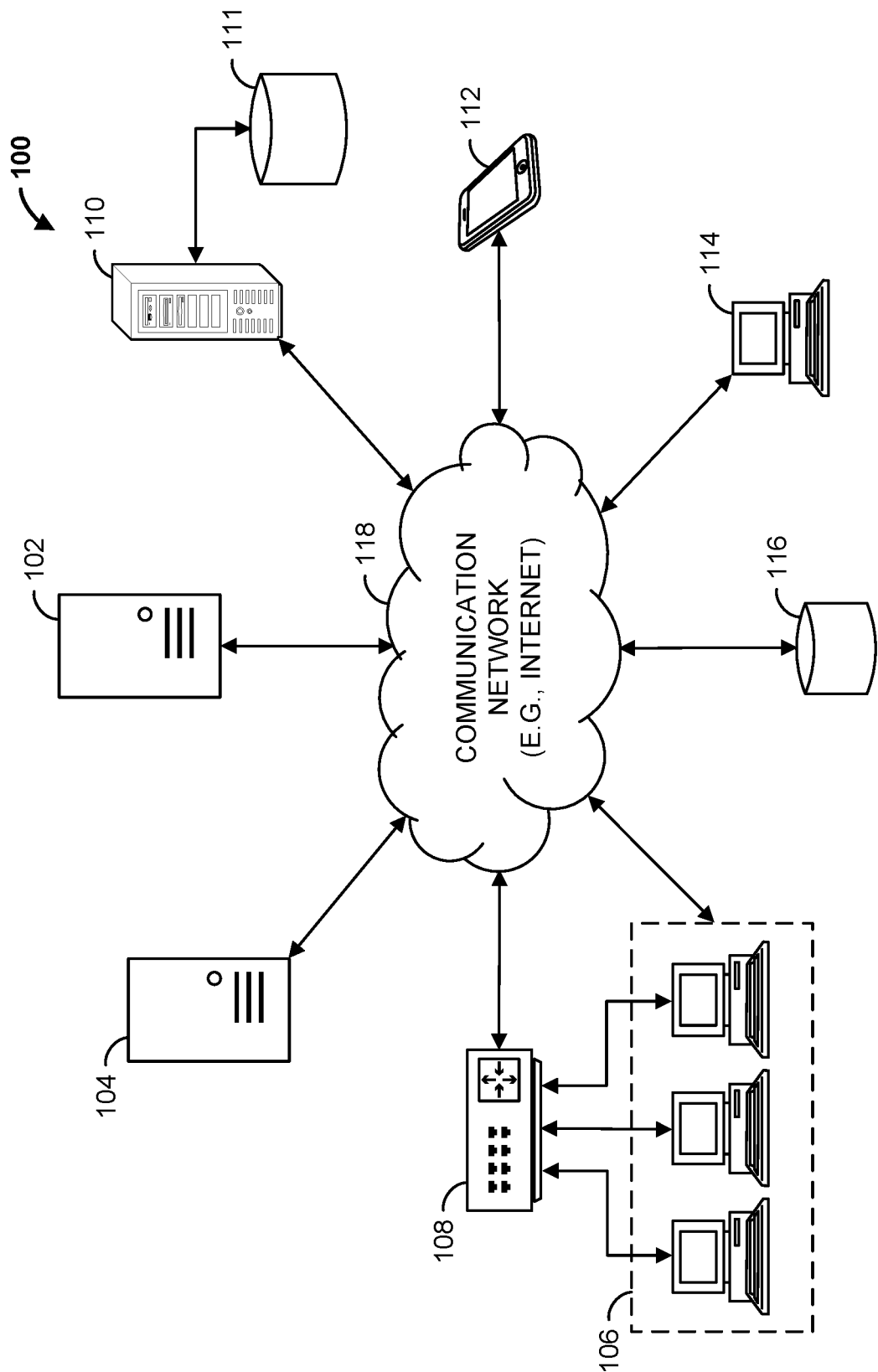
FIG. 1 is a block diagram of a data linkage system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a data linkage system 100 that includes a data linkage computing device 102 (e.g., a server, such as an application server), a web hosting device 104 (e.g., a web server), workstation(s) 106, database 116, linkage data server 110, and multiple customer computing devices 112, 114 operatively coupled over network 118. Data linkage computing device 102, web hosting device 104, linkage data server 110, and multiple customer computing devices 112, 114 can each be any suitable computing device that includes any hardware or hardware and software combination for processing and handling information. In addition, each can transmit data to, and receive data from, communication network 118.

For example, each of data linkage computing device 102, web hosting device 104, linkage data server 110, and multiple customer computing devices 112, 114 can be a computer, a workstation, a laptop, a mobile device such as a cellular phone, a web server, an application server, a cloud-based server, or any other suitable device. Each can include, for example, one or more processors, one or more field-programmable gate arrays (FPGAs), one or more application-specific integrated circuits (ASICs), one or more state machines, digital circuitry, or any other suitable circuitry.

Although FIG. 1 illustrates two customer computing devices 112, 114, data linkage system 100 can include any number of customer computing devices 112, 114. Similarly, data linkage system 100 can include any number of workstation(s) 106, data linkage computing devices 102, web servers 104, digital advertisement data servers 110, and databases 116.

Workstation(s) 106 are operably coupled to communication network 118 via router (or switch) 108. For example, workstation(s) 106 can communicate with data linkage computing device 102 over communication network 118. The workstation(s) 106 can allow for the configuration and/or programming of data linkage computing device 102, such as the controlling and/or programming of one or more processors of data linkage computing device 102. Workstation(s) 106 may also communicate with web server 104. For example, web server 104 may host one or more web pages, such as a retailer's website. Workstation(s) 106 may be operable to access and program (e.g., configure) the webpages hosted by web server 104.

Data linkage computing device 102, web server 104, and workstation(s) 106 may be operated by a retailer. Customer computing devices 112, 114 may be computing devices operated by customers of a retailer. For example, web server 104 may host one or more web pages for the retailer. Each customer computing device 112, 114 may be operable to access the one or more webpages hosted by web server 104 over communication network 118. For example, a customer operating a customer computing device 112, 114 may view a digital advertisement on a webpage hosted by web server 104, and purchase the advertised product from the retailer's website, also hosted on web server 104.

Linkage data server 110 may provide linkage data, such as customer linkage data. The linkage data may link two or more nodes, where each node may represent an identifying feature of a customer or transaction. For example, a node may identify customer information including an online identification (ID) such as a cookie, a customer account login ID, a credit card number, a purchase timestamp, a customer name, an address, a purchase timestamp, or a network address, for example. In some examples, a node may identify online advertisement activity, online purchase history, in-store purchase history, or any other customer data. In some examples, a node is known as a "trentyid" or "tid."

Linkage data may "link" two or more nodes together, indicating that the two nodes are associated. For example, linkage data may link a credit card number and an online ID together. The "link" between two nodes is known as an "edge," where the edge represents a connection between two nodes. In some examples, linkage data server 110 is operated by a third party. Linkage data sever 110 may store linkage data in a database, such as database 111.

Data linkage computing device 102 may be operable to request and receive linkage data from linkage data server 110 over communication network 118. For example, linkage data server 110 may provide linkage data related to one or more advertisement campaigns that belong to a retailer, where each advertisement campaign is associated with one or more digital advertisement placed on one or more websites. For example, linkage data server 110 may provide a continuous feed of all linkage data records that belong to any advertisement campaigns run by the retailer.

Figure 5:
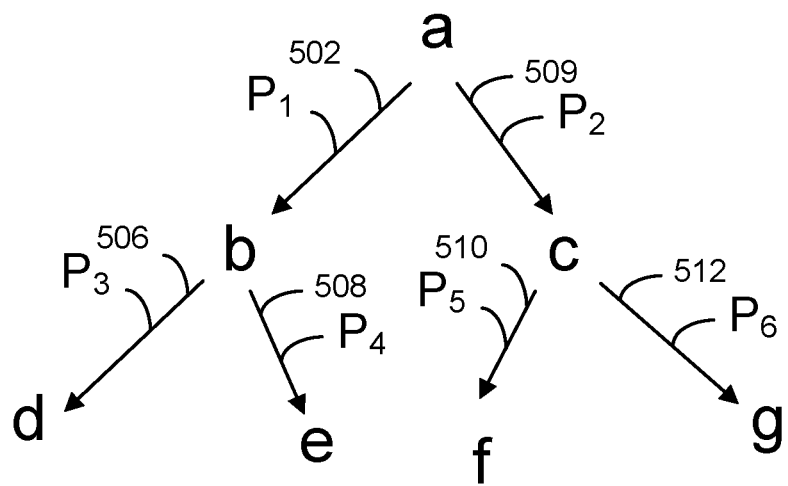
FIG. 5 illustrates an example of connected nodes with confidence levels that may be determined by the data linkage computing device of FIG. 1 in accordance with some embodiments.

In some examples, data linkage computing device 102 is operable to combine linking data to generate what is referred to in this Application, merely for convenience, as a graph. Each graph may include multiple nodes and edges between the nodes. For example, data linkage computing device 102 may combine a first link of "a→b" with a second link of "a→c" to form a graph that links "a" to "b" on a first edge, and links "a" to "c" on a second edge. An illustration of an example graph is shown in FIG. 5, which will be discuss in further detail below. FIG. 5 includes nodes "a," "b," "c," "d," "e," "f," and "g," where each node may represent customer information (e.g., each node may represent a different piece of customer information). FIG. 5 also illustrates edges between various nodes, including first edge 502 between nodes "a" and "b," second edge 504 between nodes "a" and "c," third edge 506 between nodes "b" and "d," fourth edge 508 between nodes "b" and "e," fifth edge 510 between nodes "c" and "f," sixth edge 512 between nodes "c" and "g."

Data linkage computing device 102 is operable to communicate with database 116 over communication network 118. For example, data linkage computing device 102 can store data to, and read data from, database 116. Database 116 may be a tangible, non-transitory memory. For example, database 116 may be a remote storage device, such as a cloud-based server, a memory device on another application server, a networked computer, or any other suitable remote storage. Although shown remote to data linkage computing device 102, in some examples, database 116 can be a local storage device, such as a hard drive, a non-volatile memory, or a USB stick. Database 116 may store linkage data, such as linked customer data. For example, data linkage computing device 102 may store linkage data obtained from linkage data server 110 in database 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Data linkage computing device 102 may determine confidence values (e.g., probability values, 0% to 100%) for linked data, such as linked customer data. A retailer may utilize the confidence value to determine, for example, how best to contact a customer. For example, one node may represent an email of a customer, and another node may represent the phone number of the customer. Both nodes may be connected (e.g., each have an "edge") to a customer ID of the customer. Without confidence values, both ways of communicating with the customer may seem as effective although that may not be accurate. It may be that contacting the customer via email is more effective. As such, a confidence value for each of the two edges may identify which communication channel is more effective. In some examples and in a similar way, the confidence values may determine which advertisements, such as online advertisements, are effective. For example, nodes representing both a first advertisement and a second advertisement may be connected via an edge to the customer ID of the customer. By determining confidence values, a retailer may be informed of which advertisement is more effective (e.g., effective in selling a same product, for example).

Data linkage computing device 102 may employ machine learning processes to adaptively train a classifier using, as training data, generated graphs that are based on obtained linking data, such as linking data obtained from linking data server 110. For example, the training data may include graphs with edges known to be valid, and as such are labelled positive. The training data may also include graphs with edges known to be invalid, and as such are labelled negative. The classifier may therefore have a feature set to train off of including each node of a graph, each edge of a graph representing two connected nodes, the label of each edge, and a cluster of a plurality of graphs and linked nodes thereof. The classifier may be based on a supervised learning algorithm such as Logic Regression, Support Vector Machines, Random Forest, Gradient Boosting Machines, or any other suitable learning algorithm. In some examples, data linkage computing device 102 computes weights for the various features during training.

Based on the trained classifier, data linkage computing device 102 may obtain a graph, extract features of the graph (e.g., feature extraction), and determine a confidence value for each edge of the graph. For example, as shown in FIG. 5, each edge of the graph is assigned a probability value. For example, data linkage computing device 102 may determine a probability value of "$P_1$" for edge 502. Similarly, data linkage computing device 102 may determine a probability value of "$P_2$" for edge 504, probability value of "$P_3$" for edge 506, probability value of "$P_4$" for edge 508, probability value of "$P_5$" for edge 510, and probability value of "$P_6$" for edge 512.

In some examples, a graph obtained by data linkage computing device 102 may include edges with no metadata. In some examples, metadata for different edges of a same or similar graphs can be different. During training, however, the classifier may be trained with features specific to a link, features common across multiple links, some features specific to the graph as a whole. Hence the trained classifier, in some examples with weights determined during the training period for various features, may identify the confidence scores of any linkages in an obtained graph.

Figure 2:
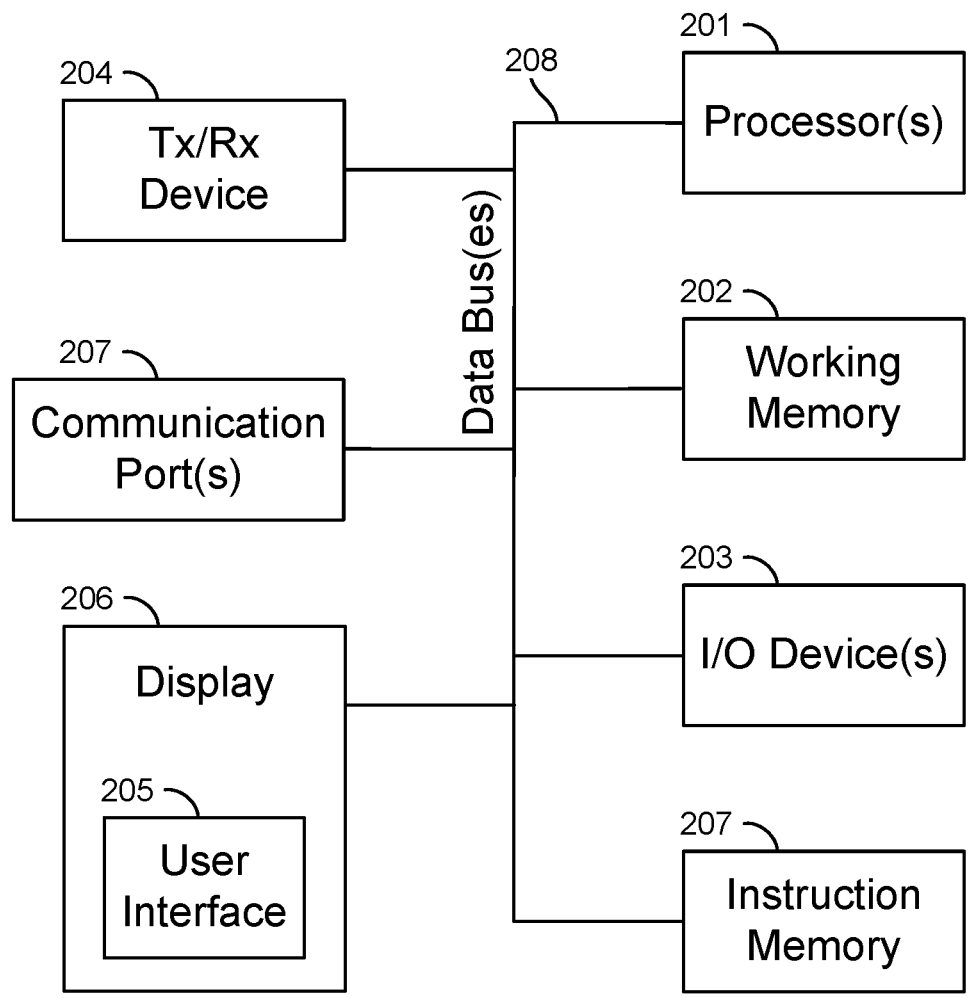
FIG. 2 is a block diagram of the data linkage computing device of FIG. 1 in accordance with some embodiments.

FIG. 2 illustrates the data linkage computing device 102 of FIG. 1. Data linkage computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of data linkage computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as linkage data or graph data.

Display 206 can display user interface 205. User interfaces 205 can enable user interaction with data linkage computing device 102. For example, user interface 205 can be a user interface for an application that allows for the viewing of semantic representations of user queries. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 data linkage computing device 102 will be operating in. Processor(s) 201 is operable to receive data from, or send data to, a network, such as communication network 118 of FIG. 1, via transceiver 204.

Figure 3:
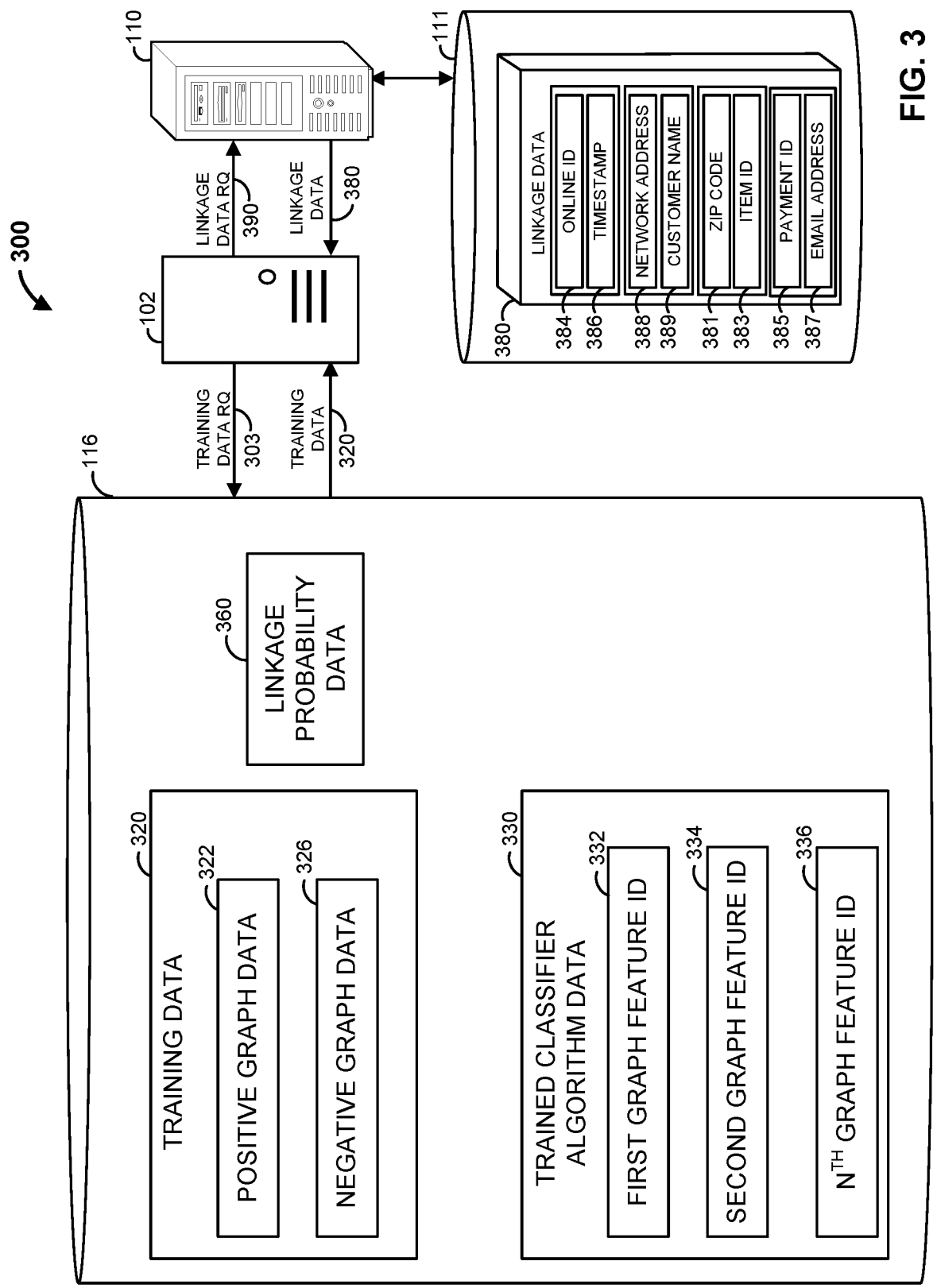
FIG. 3 is a block diagram illustrating examples of various portions of the data linkage system of FIG. 1 in accordance with some embodiments.

FIG. 3 is a block diagram illustrating examples of various portions of the data linkage system 100 of FIG. 1. As indicated in the figure, database 116 includes training data 320. Training data 320 may include graph data, such as graphs generated based on linking data. For example, training data 320 may include positive graph data 322 and negative graph data 324. Positive graph data 322 may include graph data with edges labelled as positive. Negative graph data 326 may include graph data with edges labeled as positive. Although FIG. 3 distinguishes between positive graph data 322 and negative graph data 326, it is to be appreciated that a graph may include at least one positive edge, and at least one negative edge. For example, a same graph may include one or more edges in positive graph data 322 and one or more edges in negative graph data 326.

Data linkage computing device 102 may provide training data request 303 to database 116 and, in response, receive training data 320. Data linkage computing device 102 may train a classifier, such as one based on Logic Regression, Support Vector Machines, Random Forest, Gradient Boosting Machines, or any other machine learning algorithm, based on training data 320. Based on the trained classifier, data linkage computing device 102 may generate trained classifier algorithm data 330 identifying and characterizing the trained classifier. For example, trained classifier algorithm data 330 may identify a first graph feature 332, a second graph feature 334, up to a $N^{th}$ graph feature 336. Each graph feature may identify and characterize the way a particular feature is treated by the classifier. For example, each graph feature may include a weight (e.g., a percentage) to be applied to a particular feature.

In some examples, the identified graph features are normalized. For example, customer names may be normalized so that a feature such as "first name, last name" and a feature "last name, first name," where the last names are the same and the first names are the same, resolve to be the same name (e.g., the order of the names of one of the features is changed to be the same as the other one). As another example, two edges with different names for metadata that represents the same information is normalized such that the different names are recognized as identifying the same metadata (e.g., the edge names are changed to be the same). As yet another example, date formats may be normalized (e.g., 1/10/2019 resolves to be the same as Jan. 10, 2019). Data linkage computing device 102 may store the trained classifier algorithm data 330 in database 116, for example. In some examples, to execute the classifier, data linkage computing device 102 obtains trained classifier algorithm data 330 from database 116.

Data linkage computing device 102 may apply the classifier to graph data. Data linkage computing device 102 may generate, based on execution of the classifier to graph data, a confidence (e.g., probability) value for each edge of each graph. Data linkage computing device 102 may store linkage probability data 360, which identifies and characterizes the generated confidence values for each edge of each graph, in data base 116.

Data linkage computing device 102 may generate the graph data based on, for example, linkage data 380 obtained from linking data server 110. For example, in response to a linkage data request 390, linkage data server 110 may provide linkage data 380, which may be stored in database 111, to data linkage computing device 102. Data linkage computing device 102 may combine two or more links of linkage data 380 to generate graph data. In some examples, data linkage computing device 102 generates a graph based on just one link. In some examples, in response to a linkage data request 390, linkage data server 110 may continuously provide linkage data 380 (e.g., in a feed, as it becomes available) to data linkage computing device 102.

As indicated above, database 111 may store linkage data 380, which identifies links of customer data. Each link may include two or more nodes, each node representing some customer information. For example, linkage data 380 may include a first link that associates an online ID 384 with a timestamp 386, such as a timestamp of when a digital advertisement was viewed. Linkage data 380 may also include a second link that associates a network address 388 of a computing device (such as of a computing device used to view a digital advertisement), with a customer name 389. Linkage data may include a third link that associates a zip code 381 with an item ID 383 such as an SKU of an item. Linkage data 380 may also include a fourth link that associates a payment ID 385, such as a credit card number, with an email address 387. The illustrated links are merely for illustrative purposes and can include any other customer information. In addition, in some examples linkage data 380 may include more than two nodes that are linked (e.g., online ID 384, timestamp 386, and network address 388 may be linked together in one link).

Figure 4:
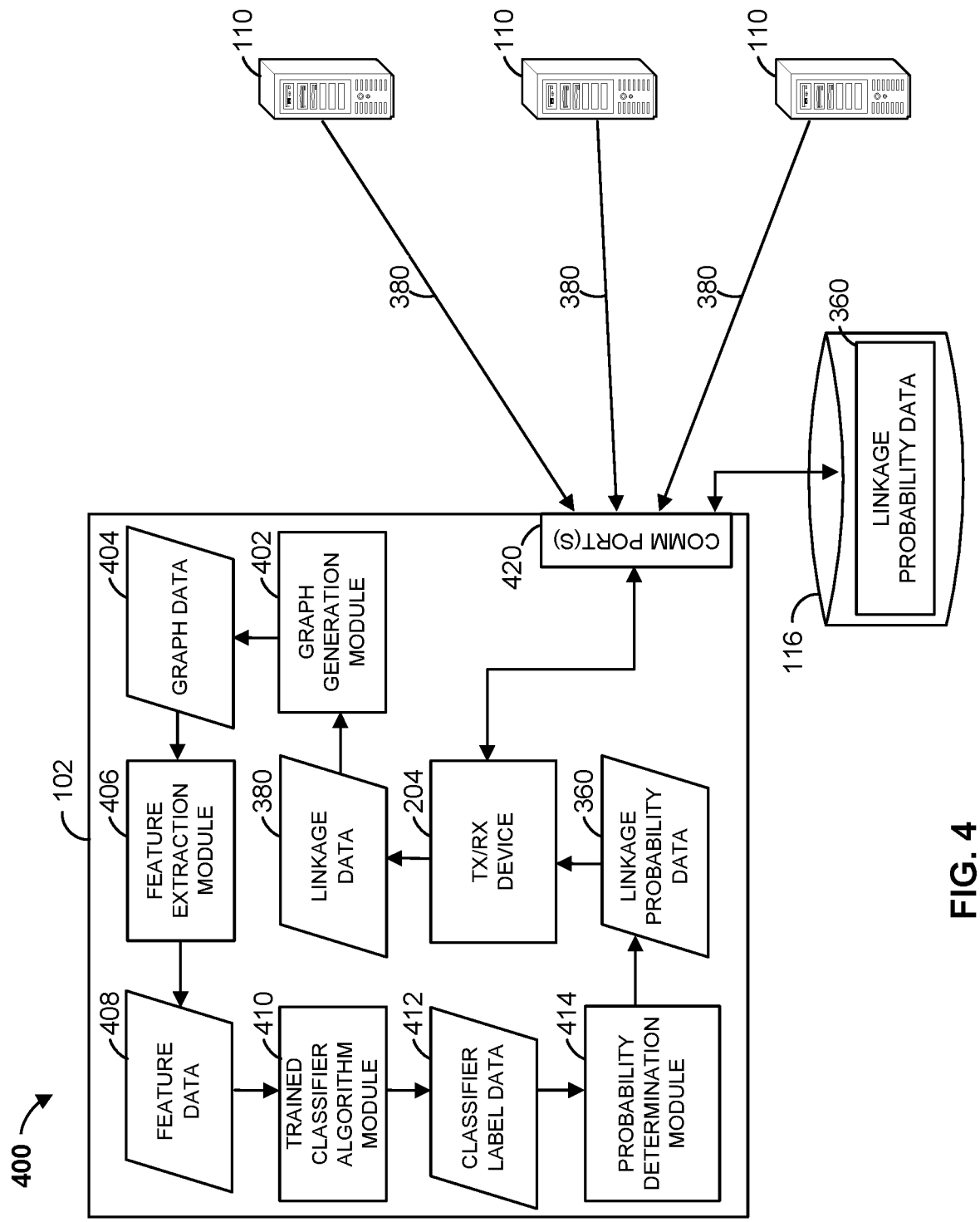
FIG. 4 is a block diagram illustrating examples of various portions of the data linkage system of FIG. 1 in accordance with some embodiments.

FIG. 4 illustrates a block diagram of various portions of the data linkage system 100 of FIG. 1. As indicated in the figure, data linkage computing device 102 includes graph generation module 402, feature extraction module 406, trained classifier algorithm module 410, and probability determination module 414. In some examples, one or more of graph generation module 402, feature extraction module 406, trained classifier algorithm module 410, and probability determination module 414 may be implemented in hardware. In some examples, one or more of graph generation module 402, feature extraction module 406, trained classifier algorithm module 410, and probability determination module 414 may be implemented as an executable program maintained in a tangible, non-transitory memory, such as instruction memory 207 of FIG. 2, that may be executed by one or processors, such as processor 201 of FIG. 2.

In this example, data linkage computing device 102 receives linkage data 380 from a plurality of linkage data servers 110. The linkage data 380 may be obtained in response to linkage data requests 390, for example. The linkage data 380 is received by transceiver 204 via communication port 420, and provided to graph generation module 402. Linking data 380 may identify links between nodes, where each node may identify customer data.

Graph generation module 402 is operable to generate graph data 404 based on linking data 380. Graph data 404 may include one or more graphs, each graph with multiple nodes and multiple edges. Each edge may link one node to another node. In some examples, graph generation module 402 combines two or more links received in linkage data 380 to generate a graph identified by graph data 404. Graph generation module 402 provides graph data 404 to feature extraction module 406.

One or more of feature extraction module 406 and trained classifier algorithm module 410 may be part of a classifier, such as one based on a supervised learning algorithm such as Logic Regression, Support Vector Machines, Random Forest, Gradient Boosting Machines, or any other suitable learning algorithm (e.g., machine learning algorithm) and feature engineering techniques.

Feature extraction module 406 may obtain, and extract features from, graph data 404 to generate feature data 408. For example, feature extraction module 406 may identify features in graph data 404 that correspond to first graph feature 332, second graph feature 334, and $N^{th}$ graph feature 336, and extract the identified features to generate feature data 408. In some examples, feature extraction module 406 normalizes the features, such as by removing the mean and dividing by the standard deviation of the features, for example, to generate feature data 408. In some examples, customer names may be normalized so that a feature such as "first name, last name" and a feature "last name, first name," where the last names are the same and the first names are the same, resolve to be the same name (e.g., the order of the names of one of the features is changed to be the same as the other one). In other examples, two edges with different names for metadata that represents the same information is normalized such that the different names are recognized as identifying the same metadata (e.g., the edge names are changed to be the same). In yet other examples, date formats may be normalized (e.g., 1/10/2019 resolves to be the same as Jan. 10, 2019).

Trained classifier algorithm module 410 obtains feature data 408 from feature extraction module 406 and executes a machine learning algorithm, such as one trained by training data 320, to generate classifier label data 412 that identifies and characterizes edges of feature data 408. For example, classifier label data 412 may include a value (e.g., score) for each edge of each features identified by feature data 408. In some examples, trained classifier algorithm module 410 obtains trained classifier algorithm data 330 from database 116 to execute the machine learning algorithm. For example, trained classifier algorithm data 330 may determine edge values based on first graph feature 332, second graph feature 334, up to $N^{th}$ graph feature 336 of trained classifier algorithm data 330.

Probability determination module 414 may obtain classifier label data 412 from trained classifier algorithm module 410, and may normalize the classifier label data 412 to generate confidence values identified by linkage probability data 360. Thus, linkage probability data 360 identifies and characterizes the generated confidence values for edges identified by classifier label data 412. Probability determination module 414 may store linkage probability data 360 in database 116. Probability determination module 414 may normalize classifier label data 412 removing the mean and dividing by the standard deviation of the features, for example. Probability determination module 414 may store linkage probability data 360 in database 116.

Figure 6:
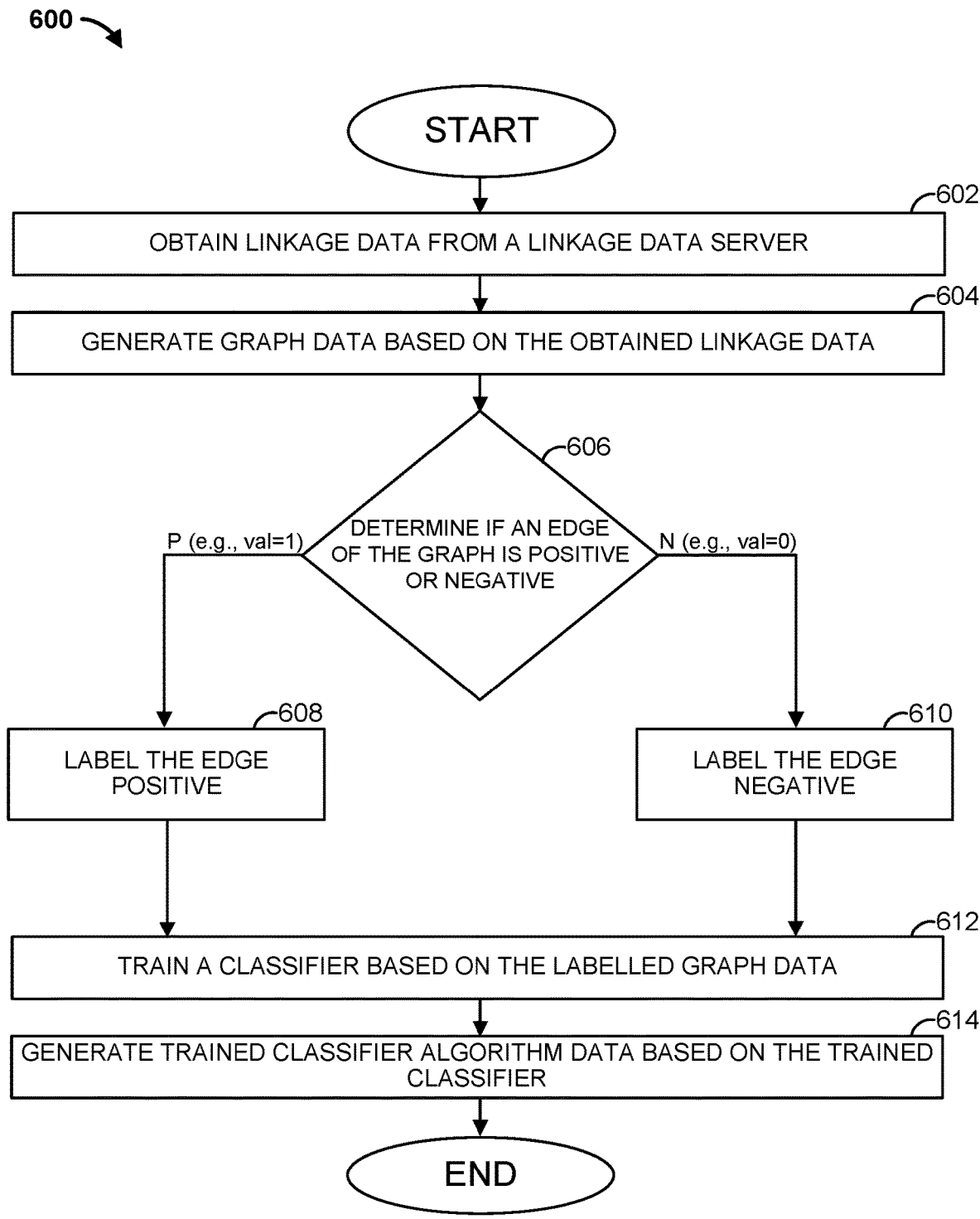
FIG. 6 is a flowchart of an example method that can be carried out by the data linkage computing device of FIG. 1 in accordance with some embodiments.

FIG. 6 is a flowchart of an example method 600 that can be carried out by, for example, the data linkage computing device 102 of FIG. 1. Beginning at step 602, linkage data is obtained from a linkage data server. For example, data linkage computing device 102 may obtain linkage data 380 from linkage data server 110. At step 604, graph data is generated based on the obtained linkage data. Each graph may include multiple nodes identified by the linking data, with each node being linked by an edge to one or more other nodes. At step 606, a determination is made as to whether each edge of the graph is positive or negative. A positive label indicates that there is a strong correlation between the nodes connected by the edge. A negative label indicates that there is a weak correlation (e.g., no correlation) between the nodes connected by the edge.

If the edge is deemed positive, the method proceeds to step 608, where the edge is labelled positive. For example, a value of "1" may be assigned to that edge. If the edge is deemed negative, the method proceeds to step 610, where the edge is labelled negative. For example, a value of "0" may be assigned to that edge. The method then proceeds, from either step 608 or step 610, to step 612.

At step 612, a classifier is trained based on the labelled graph data. The classifier may be based on a supervised learning algorithm such as Logic Regression, Support Vector Machines, Random Forest, Gradient Boosting Machines, or any other suitable learning algorithm. The method then proceeds to step 614, where trained classifier algorithm data is generated based on the trained classifier. For example, the trained classifier algorithm data may include a plurality of graph feature identifiers, where each graph feature identifier may identify and characterize the way a particular graph feature is treated by the classifier. The method then ends.

Figure 7:
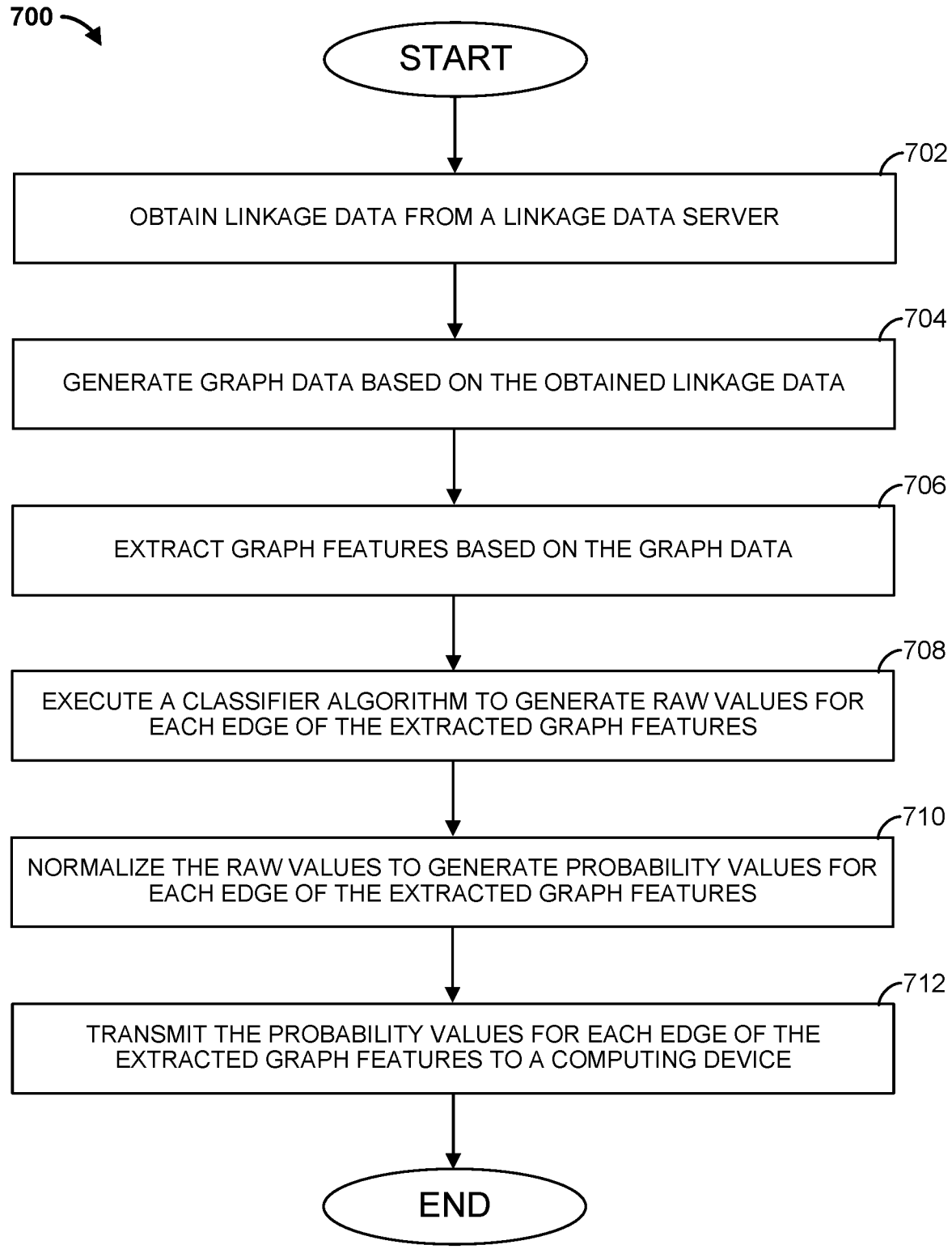
FIG. 7 is a flowchart of another example method that can be carried out by the data linkage computing device of FIG. 1 in accordance with some embodiments.

FIG. 7 is a flowchart of another example method 700 that can be carried out by, for example, the data linkage computing device 102 of FIG. 1. At step 702, linkage data, such as linkage data 380, is obtained from a linkage data server, such as linkage data server 110. At step 704, graph data is generated based on the obtained linkage data. Each graph may include multiple nodes identified by the linking data, with each node being linked by an edge to one or more other nodes. Proceeding to step 706, graph features are extracted based on the graph data. For example, the graph features may be extracted by feature extraction module 406 of data linkage computing device 102.

At step 708, a classifier algorithm is executed, where the extracted graph features are provided as an input. The classifier algorithm generates raw values for each edge of the extracted graph features. For example, the classifier algorithm may be executed by trained classifier algorithm module 410 of data linkage computing device 102. The method then proceeds to step 710, where the raw values are normalized to generate probability values for each edge of the extracted graph features. For example, probability determination module 414 of data linkage computing device 102 may generate the probability values. At step 712, the probability values are transmitted to another computing device. For example, the probability values may be transmitted to web server 104, whereby web server 104 may utilize the probability values to determine preferable contact or advertisement decisions.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
obtain training data comprising a plurality of training nodes linked by a plurality of training edges;
train a machine learning algorithm based on the obtained training data;
obtain linkage data identifying a plurality of linkages, wherein each linkage identifies a plurality of nodes, wherein each node identifies customer information including:
customer identification (ID), contact information, and online advertisement activity;
generate graph data identifying a plurality of edges, wherein each edge associates at least two of the plurality of nodes of each linkage of the plurality of linkages; and
execute the machine learning algorithm based on the generated graph data to generate a probability value for each edge associated with the at least two of the plurality of nodes of each linkage of the plurality of linkages, wherein the probability value indicates a confidence level of a connection represented by the edge between the at least two nodes.

2. The system of claim 1, wherein the computing device is configured to determine a label for each of the plurality of training edges.

3. The system of claim 2, wherein the computing device is configured to:
determine that the label for each of the plurality of training edges is positive or negative based on a level of correlation between the training nodes linked by the training edge;
assign a value of 1 to each training edge that is labelled positive; and
assign a value of 0 to each training edge that is labelled negative.

4. The system of claim 1, wherein executing the machine learning algorithm comprises extracting a plurality of graph features based on the generated graph data.

5. The system of claim 4, wherein executing the machine learning algorithm comprises using the plurality of graph features as an input to the machine learning algorithm to generate a raw value for each edge associated with the at least two of the plurality of nodes of each linkage of the plurality of linkages.

6. The system of claim 5, wherein the probability value is generated based on the raw value for each edge associated with the at least two of the plurality of nodes of each linkage of the plurality of linkages.

7. The system of claim 1, wherein:
the computing device is configured to transmit the probability values for the plurality of edges to a different computing device; and
the probability values are utilized by the different computing device to determine at least one of: a preferable contact of a customer or an advertisement for the customer.

8. The system of claim 1, wherein the machine learning algorithm is based on at least one of: a Logic Regression, Support Vector Machines, or Gradient Boosting Machines algorithm.

9. A method comprising:
obtaining training data comprising a plurality of training nodes linked by a plurality of training edges;
training a machine learning algorithm based on the obtained training data;
obtaining linkage data identifying a plurality of linkages, wherein each linkage identifies a plurality of nodes, wherein each node identifies customer information including: customer identification (ID), contact information, and online advertisement activity;
generating graph data identifying a plurality of edges, wherein each edge associates at least two of the plurality of nodes of each linkage of the plurality of linkages; and
executing the machine learning algorithm based on the generated graph data to generate a probability value for each edge associated with the at least two of the plurality of nodes of each linkage of the plurality of linkages, wherein the probability value indicates a confidence level of a connection represented by the edge between the at least two nodes.

10. The method of claim 9 further comprising determining a label for each of the plurality of training edges.

11. The method of claim 10 further comprising:
determining that the label for each of the plurality of training edges is positive or negative based on a level of correlation between the training nodes linked by the training edge;
assigning a value of 1 to each training edge that is labelled positive; and
assigning a value of 0 to each training edge that is labelled negative.

12. The method of claim 9 wherein executing the machine learning algorithm comprises extracting a plurality of graph features based on the generated graph data.

13. The method of claim 12 wherein executing the machine learning algorithm comprises using the plurality of graph features as an input to the machine learning algorithm to generate a raw value for each edge associated with the at least two of the plurality of nodes of each linkage of the plurality of linkages.

14. The method of claim 13 wherein the probability value is generated based on the raw value for each edge associated with the at least two of the plurality of nodes of each linkage of the plurality of linkages.

15. The method of claim 9 wherein the machine learning algorithm is based on at least one of: a Logic Regression, Support Vector Machines, or Gradient Boosting Machines algorithm.

16. A non-transitory computer readable medium having instructions stored thereon, wherein the instructions, when executed by at least one processor, cause a device to perform operations comprising:
    obtaining training data comprising a plurality of training nodes linked by a plurality of training edges;
    training a machine learning algorithm based on the obtained training data;
    obtaining linkage data identifying a plurality of linkages, wherein each linkage identifies a plurality of nodes, wherein each node identifies customer information including: customer identification (ID), contact information, and online advertisement activity;
    generating graph data identifying a plurality of edges, wherein each edge associates at least two of the plurality of nodes of each linkage of the plurality of linkages; and
    executing the machine learning algorithm based on the generated graph data to generate a probability value for each edge associated with the at least two of the plurality of nodes of each linkage of the plurality of linkages, wherein the probability value indicates a confidence level of a connection represented by the edge between the at least two nodes.

17. The non-transitory computer readable medium of claim 16 further comprising instructions stored thereon that, when executed by at least one processor, further cause the device to perform operations comprising:
    determining a label for each of the plurality of training edges.

18. The non-transitory computer readable medium of claim 16 further comprising instructions stored thereon that, when executed by at least one processor, further cause the device to perform operations comprising:
    extracting a plurality of graph features based on the generated graph data.

19. The non-transitory computer readable medium of claim 18 further comprising instructions stored thereon that, when executed by at least one processor, further cause the device to perform operations comprising:
    using the plurality of graph features as an input to the machine learning algorithm to generate a raw value for each edge associated with the at least two of the plurality of nodes of each linkage of the plurality of linkages.

20. The non-transitory computer readable medium of claim 19
    wherein the probability value is generated based on the raw value for each edge associated with the at least two of the plurality of nodes of each linkage of the plurality of linkages.

* * * * *